US012559228B2

(12) United States Patent
Moore et al.

(10) Patent No.: US 12,559,228 B2
(45) Date of Patent: Feb. 24, 2026

(54) THERMAL MANAGEMENT SYSTEM FOR AN AIRCRAFT INCLUDING AN ELECTRIC PROPULSION ENGINE

(71) Applicant: General Electric Company, Schenectady, NY (US)

(72) Inventors: Nicholas Taylor Moore, Cincinnati, OH (US); Andrew James Fleming, Franklin, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/102,977

(22) Filed: Jan. 30, 2023

(65) Prior Publication Data
US 2023/0365264 A1      Nov. 16, 2023

Related U.S. Application Data

(62) Division of application No. 16/211,972, filed on Dec. 6, 2018, now abandoned.

(51) Int. Cl.
*B64C 21/01*          (2023.01)
*B64D 27/32*          (2024.01)
(Continued)

(52) U.S. Cl.
CPC .............. *B64C 21/01* (2023.01); *B64D 27/32* (2024.01); *B64D 27/33* (2024.01); *B64D 31/16* (2024.01);
(Continued)

(58) Field of Classification Search
CPC ........ B64D 33/10; B64D 27/33; B64D 31/16; B64D 13/06; B64D 13/08; B64D 27/026;
(Continued)

(56) References Cited

U.S. PATENT DOCUMENTS

| 2,582,842 A | 1/1952 | Messinger |
| 2,812,912 A | 11/1957 | Stevens et al. |

(Continued)

FOREIGN PATENT DOCUMENTS

| GB | 2489311 A | 9/2012 |
| WO | WO2010/020199 A1 | 2/2010 |
| WO | WO2014/072615 A1 | 5/2014 |

OTHER PUBLICATIONS

Http://aviationweek.com/awin/boeing-researchers-alternative-propulsion-and-fuel-options, Aviation Week & Space Technology, Jun. 4, 2012.

(Continued)

*Primary Examiner* — Mohamed Abdo Algehaim
(74) *Attorney, Agent, or Firm* — Dority & Manning, P.A.

(57) ABSTRACT

An aircraft includes an aircraft heat source; a propulsion system including an electric propulsion engine, the electric propulsion engine including an electric motor and a fan rotatable by the electric motor, the electric propulsion engine further defining a fan air flowpath; a thermal management system including a heat source exchanger in thermal communication with the aircraft heat source, a heat sink exchanger in thermal communication with the fan air flowpath of the electric propulsion engine, and a thermal distribution bus extending from the heat source exchanger to the heat sink exchanger; and a control system operably connected to the thermal management system for selectively thermally coupling the heat sink exchanger with the heat source exchanger.

8 Claims, 5 Drawing Sheets

(51) Int. Cl.

| | |
|---|---|
| *B64D 27/33* | (2024.01) |
| *B64D 31/16* | (2024.01) |
| *B64D 31/18* | (2024.01) |
| *B64D 33/10* | (2006.01) |
| *B64D 35/025* | (2025.01) |
| *H02K 9/06* | (2006.01) |
| *H02K 9/18* | (2006.01) |
| *H02P 3/18* | (2006.01) |

(52) U.S. Cl.
CPC ............. *B64D 31/18* (2024.01); *B64D 33/10* (2013.01); *B64D 35/025* (2024.01); *H02K 9/06* (2013.01); *H02K 9/18* (2013.01); *H02P 3/18* (2013.01)

(58) Field of Classification Search
CPC ........ B64D 29/04; B64D 27/24; B64C 21/01; H02K 9/06; H02K 9/18; H02P 3/18; Y02T 50/10; Y02T 50/60
USPC ....................................................... 701/29.1
See application file for complete search history.

(56) References Cited

U.S. PATENT DOCUMENTS

| | | | |
|---|---|---|---|
| 3,286,470 A | 11/1966 | Gerlaugh | |
| 3,312,448 A | 4/1967 | Hull, Jr. et al. | |
| 3,332,242 A | 7/1967 | Douglas | |
| 3,387,647 A | 6/1968 | Heskestad et al. | |
| 3,844,110 A | 10/1974 | Widlansky et al. | |
| 4,089,493 A | 5/1978 | Paulson | |
| 4,187,675 A | 2/1980 | Wakeman | |
| 4,605,185 A | 8/1986 | Reyes | |
| 4,913,380 A | 4/1990 | Verdaman et al. | |
| 5,125,597 A | 6/1992 | Coffinberry | |
| 5,269,135 A | 12/1993 | Vermejan et al. | |
| 5,927,644 A | 7/1999 | Ellis et al. | |
| 6,092,360 A | 7/2000 | Hoag et al. | |
| 6,415,595 B1 | 7/2002 | Wilmot, Jr. et al. | |
| 6,651,929 B2 | 11/2003 | Dionne | |
| 6,976,655 B2 | 12/2005 | Thompson | |
| 7,000,404 B2 | 2/2006 | Palmisano et al. | |
| 7,267,300 B2 | 9/2007 | Heath et al. | |
| 7,387,189 B2 | 6/2008 | James et al. | |
| 7,493,754 B2 | 2/2009 | Moniz et al. | |
| 7,665,689 B2 | 2/2010 | McComb | |
| 7,752,834 B2 | 7/2010 | Addis | |
| 7,806,363 B2 | 10/2010 | Udall et al. | |
| 7,819,358 B2 | 10/2010 | Belleville | |
| 7,905,449 B2 | 3/2011 | Cazals et al. | |
| 7,976,273 B2 | 7/2011 | Suciu et al. | |
| 8,033,094 B2 | 10/2011 | Suciu et al. | |
| 8,099,944 B2 | 1/2012 | Foster et al. | |
| 8,109,073 B2 | 2/2012 | Foster et al. | |
| 8,128,019 B2 | 3/2012 | Annati et al. | |
| 8,162,254 B2 | 4/2012 | Roche | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,387,362 B2 * | 3/2013 | Storage .................. F02K 3/115 | |
| | | | 60/266 |
| 8,469,306 B2 | 6/2013 | Kuhn, Jr. | |
| 8,492,920 B2 | 7/2013 | Huang et al. | |
| 8,499,544 B2 | 8/2013 | Shafer et al. | |
| 8,549,833 B2 | 10/2013 | Hyde et al. | |
| 8,552,575 B2 | 10/2013 | Teets et al. | |
| 8,596,036 B2 | 12/2013 | Hyde et al. | |
| 8,640,439 B2 | 2/2014 | Hoffjann et al. | |
| 8,672,263 B2 | 3/2014 | Stolte | |
| 8,684,304 B2 | 4/2014 | Burns et al. | |
| 8,723,349 B2 | 5/2014 | Huang et al. | |
| 8,723,385 B2 | 5/2014 | Jia et al. | |
| 8,756,910 B2 | 6/2014 | Donovan et al. | |

| | | | |
|---|---|---|---|
| 8,857,191 B2 | 10/2014 | Hyde et al. | |
| 8,890,343 B2 | 11/2014 | Bulin et al. | |
| 8,939,399 B2 | 1/2015 | Kouros et al. | |
| 8,998,580 B2 | 4/2015 | Quiroz-Hernandez | |
| 9,038,398 B2 | 5/2015 | Suciu et al. | |
| 9,429,076 B2 | 8/2016 | Smith et al. | |
| 9,534,538 B1 | 1/2017 | Cerny | |
| 9,624,779 B2 | 4/2017 | Schick et al. | |
| 10,099,028 B2 * | 10/2018 | Wondka ................... F17C 9/02 | |
| 10,174,665 B2 * | 1/2019 | Thomassin ........... B64D 33/10 | |
| 10,215,097 B2 | 2/2019 | Miller et al. | |
| 10,443,499 B2 * | 10/2019 | Snyder ................... F02C 7/224 | |
| 10,752,374 B1 * | 8/2020 | Lui ....................... B64D 13/08 | |
| 2005/0150970 A1 | 7/2005 | Beutin et al. | |
| 2008/0095611 A1 * | 4/2008 | Storage .................. F28F 1/022 | |
| | | | 415/116 |
| 2008/0110596 A1 * | 5/2008 | Schwarz ................ F01D 25/08 | |
| | | | 165/104.11 |
| 2008/0121376 A1 * | 5/2008 | Schwarz ................ F01D 25/18 | |
| | | | 165/104.28 |
| 2009/0188232 A1 | 7/2009 | Suciu et al. | |
| 2010/0038473 A1 | 2/2010 | Schneider et al. | |
| 2012/0119020 A1 | 5/2012 | Burns et al. | |
| 2012/0153076 A1 | 6/2012 | Burns et al. | |
| 2012/0209456 A1 | 8/2012 | Harmon et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0062885 A1 | 3/2013 | Taneja | |
| 2013/0088019 A1 | 4/2013 | Huang et al. | |
| 2013/0099065 A1 | 4/2013 | Stuhlberger | |
| 2013/0139515 A1 | 6/2013 | Schlak | |
| 2013/0154359 A1 | 6/2013 | Huang et al. | |
| 2013/0184958 A1 | 7/2013 | Dyrla et al. | |
| 2013/0227950 A1 | 9/2013 | Anderson et al. | |
| 2013/0251525 A1 | 9/2013 | Saiz | |
| 2013/0255281 A1 * | 10/2013 | Bray .................. H05K 7/20372 | |
| | | | 62/62 |
| 2013/0306024 A1 | 11/2013 | Rolt | |
| 2013/0318983 A1 | 12/2013 | Zhou et al. | |
| 2014/0010652 A1 | 1/2014 | Suntharalingam et al. | |
| 2014/0060995 A1 | 3/2014 | Anderson et al. | |
| 2014/0151495 A1 | 6/2014 | Kuhn, Jr. | |
| 2014/0250861 A1 | 9/2014 | Eames | |
| 2014/0260340 A1 * | 9/2014 | Vaisman ............... B64D 13/06 | |
| | | | 62/335 |
| 2014/0283519 A1 | 9/2014 | Mariotto et al. | |
| 2014/0290208 A1 | 10/2014 | Rechain et al. | |
| 2014/0339371 A1 | 11/2014 | Yates et al. | |
| 2014/0345281 A1 | 11/2014 | Galbraith | |
| 2014/0346283 A1 | 11/2014 | Salyer | |
| 2014/0352348 A1 | 12/2014 | Army, Jr. et al. | |
| 2014/0367510 A1 | 12/2014 | Viala et al. | |
| 2014/0367525 A1 | 12/2014 | Salyer | |
| 2014/0369810 A1 | 12/2014 | Binks et al. | |
| 2015/0013306 A1 | 1/2015 | Shelley | |
| 2015/0028594 A1 | 1/2015 | Mariotto | |
| 2015/0151844 A1 | 6/2015 | Anton et al. | |
| 2015/0354450 A1 * | 12/2015 | Vaisman ................ F02C 7/143 | |
| | | | 60/726 |
| 2015/0380999 A1 | 12/2015 | Joshi et al. | |
| 2016/0131036 A1 * | 5/2016 | Bintz ...................... F02C 7/14 | |
| | | | 60/726 |
| 2016/0215731 A1 | 7/2016 | Makowski et al. | |
| 2016/0223234 A1 * | 8/2016 | Vaisman ............... F25B 49/005 | |
| 2016/0280387 A1 * | 9/2016 | Snape ..................... F02C 7/14 | |
| 2017/0002685 A1 * | 1/2017 | Todorovic ................ F01D 9/02 | |
| 2017/0030266 A1 * | 2/2017 | Cerny .................... F02C 7/224 | |
| 2017/0081034 A1 * | 3/2017 | Marrinan ............... B64D 29/04 | |
| 2017/0082028 A1 * | 3/2017 | Duong ..................... F02C 7/32 | |
| 2017/0167382 A1 * | 6/2017 | Miller ................... B64D 15/06 | |
| 2017/0268409 A1 | 9/2017 | Thomassin et al. | |
| 2018/0023416 A1 * | 1/2018 | Riaz ....................... F01D 25/12 | |
| | | | 415/1 |
| 2018/0050300 A1 * | 2/2018 | Rheaume ............ B01D 53/326 | |
| 2018/0050810 A1 | 2/2018 | Niergarth et al. | |
| 2018/0051716 A1 | 2/2018 | Cheung et al. | |
| 2018/0215475 A1 | 8/2018 | Hurt et al. | |

(56)                    References Cited

U.S. PATENT DOCUMENTS

| | | | | |
|---|---|---|---|---|
| 2018/0230908 | A1* | 8/2018 | Pesyna | F02C 7/14 |
| 2019/0293346 | A1* | 9/2019 | Schwarz | B64D 13/06 |
| 2020/0039654 | A1* | 2/2020 | Smith | B64D 27/026 |
| 2020/0131997 | A1* | 4/2020 | Hanlon | F02C 7/057 |
| 2020/0355121 | A1* | 11/2020 | O'Meallie | F02C 7/277 |
| 2022/0340287 | A1* | 10/2022 | Mackin | B64D 13/08 |

OTHER PUBLICATIONS

Bradley et al., Subsonic Ultra Green Aircraft Research, Phase II: N+4 Advanced Concept Development, NASA/CR-2012-217556, May 2012.

Bouferrouk et al., Innovative Methods for the Passive and Active Control of Flow and Heat Transfer for Gas Turbine Blade Cooling, FET 07.

* cited by examiner

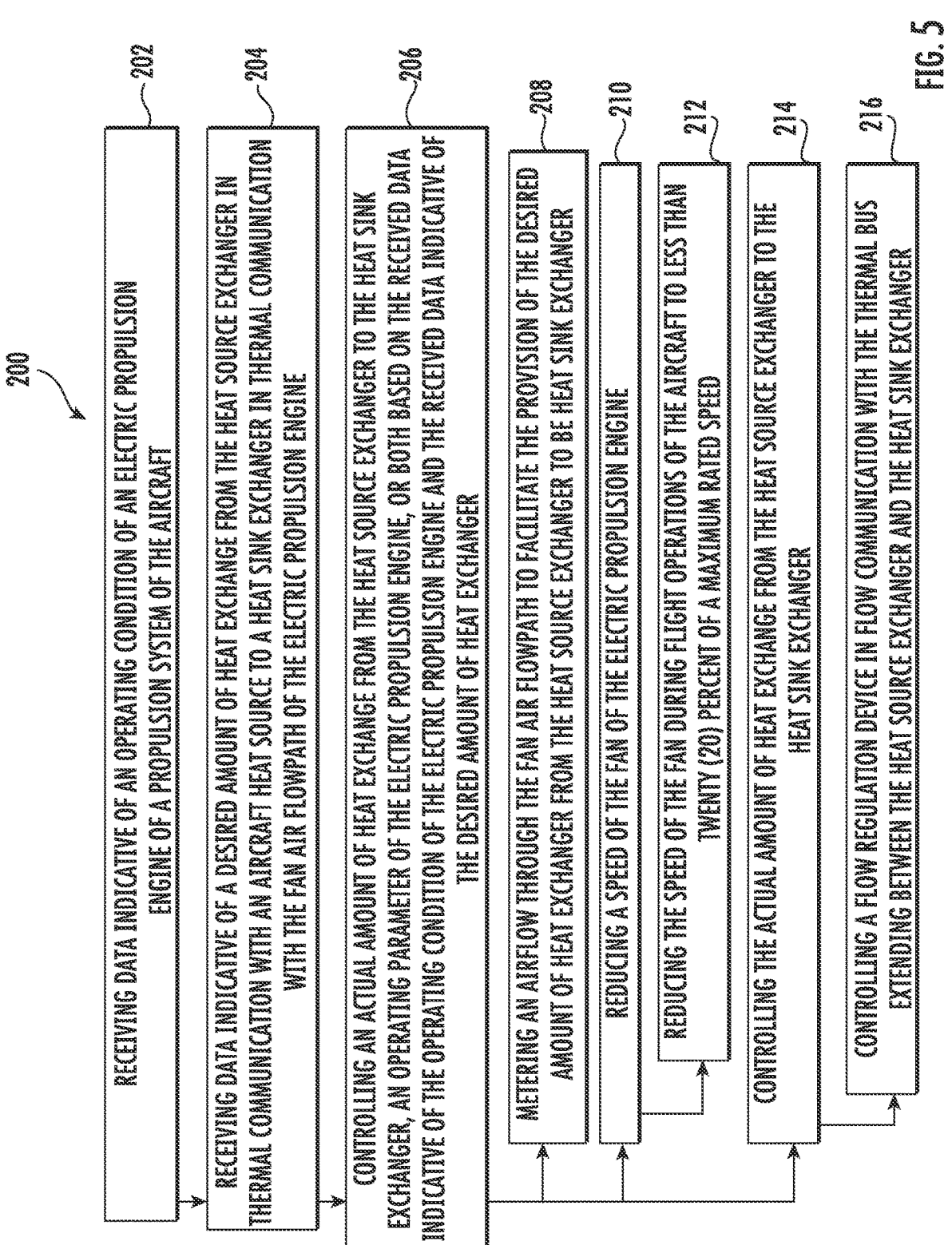

200

202 — RECEIVING DATA INDICATIVE OF AN OPERATING CONDITION OF AN ELECTRIC PROPULSION ENGINE OF A PROPULSION SYSTEM OF THE AIRCRAFT

204 — RECEIVING DATA INDICATIVE OF A DESIRED AMOUNT OF HEAT EXCHANGE FROM THE HEAT SOURCE EXCHANGER IN THERMAL COMMUNICATION WITH AN AIRCRAFT HEAT SOURCE TO A HEAT SINK EXCHANGER IN THERMAL COMMUNICATION WITH THE FAN AIR FLOWPATH OF THE ELECTRIC PROPULSION ENGINE

206 — CONTROLLING AN ACTUAL AMOUNT OF HEAT EXCHANGE FROM THE HEAT SOURCE EXCHANGER TO THE HEAT SINK EXCHANGER, AN OPERATING PARAMETER OF THE ELECTRIC PROPULSION ENGINE, OR BOTH BASED ON THE RECEIVED DATA INDICATIVE OF THE OPERATING CONDITION OF THE ELECTRIC PROPULSION ENGINE AND THE RECEIVED DATA INDICATIVE OF THE DESIRED AMOUNT OF HEAT EXCHANGER

208 — METERING AN AIRFLOW THROUGH THE FAN AIR FLOWPATH TO FACILITATE THE PROVISION OF THE DESIRED AMOUNT OF HEAT EXCHANGER FROM THE HEAT SOURCE EXCHANGER TO BE HEAT SINK EXCHANGER

210 — REDUCING A SPEED OF THE FAN OF THE ELECTRIC PROPULSION ENGINE

212 — REDUCING THE SPEED OF THE FAN DURING FLIGHT OPERATIONS OF THE AIRCRAFT TO LESS THAN TWENTY (20) PERCENT OF A MAXIMUM RATED SPEED

214 — CONTROLLING THE ACTUAL AMOUNT OF HEAT EXCHANGE FROM THE HEAT SOURCE EXCHANGER TO THE HEAT SINK EXCHANGER

216 — CONTROLLING A FLOW REGULATION DEVICE IN FLOW COMMUNICATION WITH THE THERMAL BUS EXTENDING BETWEEN THE HEAT SOURCE EXCHANGER AND THE HEAT SINK EXCHANGER

FIG. 5

THERMAL MANAGEMENT SYSTEM FOR AN AIRCRAFT INCLUDING AN ELECTRIC PROPULSION ENGINE

CROSS-REFERENCE TO RELATED APPLICATIONS

This application is a divisional application of U.S. application Ser. No. 16/211,972 filed Dec. 6, 2018, which is hereby incorporated by reference in its entirety.

FIELD

The present subject matter relates generally to a thermal management system for an aircraft including an electric propulsion engine and a method of controlling the same.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as suspended position beneath the wing. More recent aircraft, however, have proposed electric or hybrid-electric propulsion systems including electric propulsion engines, such as electric fans.

Regardless of the propulsion system utilized, various systems of the aircraft may generate a relatively large amount of heat during certain operating conditions of the aircraft. For example, an environmental control system of the aircraft may generate a varying amount of heat based on ambient conditions of the aircraft. Certain aircraft include ram air heat exchangers that are deployable during conditions in which the various aircraft systems generate relatively high amounts of heat to reject such heat.

However, the ram air heat exchangers may cause an undesirably high amount of additional drag on the aircraft, reducing an overall efficiency of the aircraft. Accordingly, an aircraft capable of rejecting heat from various aircraft systems when such systems are generating a relatively high amount of heat would be useful.

BRIEF DESCRIPTION

Aspects and advantages of the invention will be set forth in part in the following description, or may be obvious from the description, or may be learned through practice of the invention.

In one exemplary embodiment of the present disclosure, an aircraft is provided. The aircraft includes an aircraft heat source; a propulsion system including an electric propulsion engine, the electric propulsion engine including an electric motor and a fan rotatable by the electric motor, the electric propulsion engine further defining a fan air flowpath; a thermal management system including a heat source exchanger in thermal communication with the aircraft heat source, a heat sink exchanger in thermal communication with the fan air flowpath of the electric propulsion engine, and a thermal distribution bus extending from the heat source exchanger to the heat sink exchanger; and a control system operably connected to the thermal management system for selectively thermally coupling the heat sink exchanger with the heat source exchanger.

In certain exemplary embodiments the aircraft heat source is an avionics system heat source, a cockpit heat source, an aircraft environmental control system heat source, a combustion engine heat source, a non-biological heat source, or a hydraulic load heat source.

In certain exemplary embodiments the aircraft further includes a pair of wings, wherein heat source exchanger is aligned with the pair of wings along a longitudinal direction of the aircraft or positioned forward of the pair of wings along the longitudinal direction of the aircraft, and wherein the heat sink exchanger is positioned aft of the pair of wings along the longitudinal direction of the aircraft.

In certain exemplary embodiments the electric propulsion engine is a boundary layer ingestion fan.

For example, in certain exemplary embodiments the aircraft includes a fuselage defining an aft end, and wherein the boundary layer ingestion fan is coupled to the fuselage at the aft end.

In certain exemplary embodiments the electric propulsion engine includes an outer nacelle, and wherein the fan air flowpath is a ducted air flowpath defined in part by the outer nacelle.

For example, in certain exemplary embodiments the electric propulsion engine includes a stage of guide vanes, and wherein the heat sink exchanger is coupled to, or integrated with, the stage of guide vanes, the outer nacelle, or both.

For example, in certain exemplary embodiments the stage of guide vanes is a stage of inlet guide vanes.

In certain exemplary embodiments the thermal management system includes a flow regulation device operable with the thermal distribution bus for varying a flow of thermal fluid through the thermal distribution bus, and wherein the control system is operably coupled to the flow regulation device.

For example, in certain exemplary embodiments the flow regulation device is a variable throughput valve positioned in flow communication with the thermal distribution bus, a thermal fluid pump positioned in flow communication with the thermal distribution bus, or both.

In certain exemplary embodiments the thermal management system is an aircraft thermal management system, wherein the heat source exchanger is an aircraft heat source exchanger, wherein the electric propulsion engine further includes an engine thermal management system, wherein the engine thermal management system includes an engine heat source exchanger, and wherein the engine heat source exchanger is in thermal communication with the heat sink exchanger of the aircraft thermal management system.

In certain exemplary embodiments the thermal management system is an aircraft thermal management system, wherein the heat source exchanger is an aircraft heat source exchanger, wherein the heat sink exchanger is an aircraft heat sink exchanger, wherein the electric propulsion engine further includes an engine thermal management system, wherein the engine thermal management system includes an engine heat source exchanger and an engine heat sink exchanger, and wherein the engine heat sink exchanger is also in thermal communication with the fan air flowpath.

For example, in certain exemplary embodiments the aircraft heat sink exchanger and engine heat sink exchanger are arranged in series within the fan air flowpath, in parallel within the fan air flowpath, or both.

In an exemplary aspect of the present disclosure a method is provided for operating an aircraft. The method includes receiving data indicative of an operating condition of an electric propulsion engine of a propulsion system of the aircraft; receiving data indicative of a desired amount of heat exchange from a heat source exchanger in thermal communication with an aircraft heat source to a heat sink exchanger in thermal communication with a fan air flowpath of the electric propulsion engine; and controlling an actual amount of heat exchange from the heat source exchanger to the heat sink exchanger, an operating parameter of the electric propulsion engine, or both based on the received data indicative of the operating condition of the electric propulsion engine and the received data indicative of the desired amount of heat exchange.

In certain exemplary aspects the operating condition of the electric propulsion engine is a speed of a fan of the electric propulsion engine.

In certain exemplary aspects controlling an actual amount of heat exchange from the heat source exchanger to the heat sink exchanger, an operating parameter of the electric propulsion engine, or both includes reducing a speed of a fan of the electric propulsion engine.

For example, in certain exemplary aspects reducing the speed of the fan of the electric propulsion engine includes reducing the speed of the fan during flight operations of the aircraft to less than twenty (20) percent of the maximum rated speed.

In certain exemplary aspects controlling an actual amount of heat exchange from the heat source exchanger to the heat sink exchanger, an operating parameter of the electric propulsion engine, or both includes metering an airflow through the fan air flowpath to facilitate the provision of the desired amount of heat exchange from the heat source exchanger to the heat sink exchanger.

In certain exemplary aspects controlling an actual amount of heat exchange from the heat source exchanger to the heat sink exchanger, an operating parameter of the electric propulsion engine, or both includes controlling the actual amount of heat exchange from the heat source exchanger to the heat sink exchanger.

For example, in certain exemplary aspects controlling the actual amount of heat exchange from the heat source exchanger to the heat sink exchanger includes controlling a flow regulation device in flow communication with a thermal bus extending between the heat source exchanger and the heat sink exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is a flow diagram of a method for operating an aircraft in accordance with an exemplary aspect of the present disclosure.

DETAILED DESCRIPTION

Figure 1:
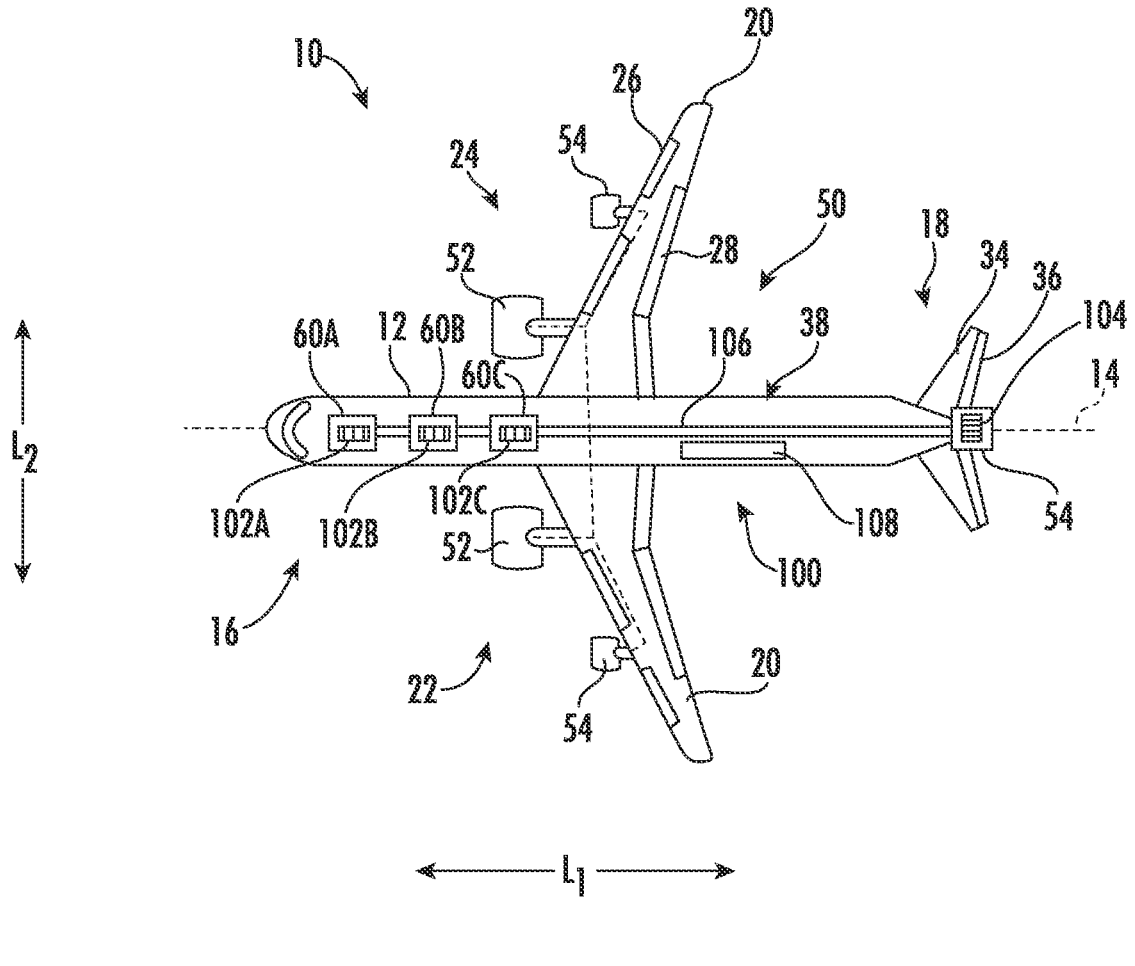
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within an engine or vehicle and refer to the normal operational attitude of the engine or vehicle. For example, with regard to an engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present invention. As shown in FIG. 1, the aircraft 10 defines a longitudinal centerline 14 that extends therethrough, a longitudinal direction L1, a lateral direction L2, a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer having a rudder flap for yaw control (not shown), and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction or horizontal/lateral direction L2.

The exemplary aircraft 10 of FIG. 1 additionally includes a propulsion system 50. The exemplary propulsion system 50 includes one or more propulsion engines, and more specifically includes a plurality of gas turbine propulsion engines 52 and a plurality of electric propulsion engines 54. For example, the embodiment depicted includes two gas turbine propulsion engines 52, each arranged in an under-wing configuration, and three electric propulsion engines 54. Two of the electric propulsion engines 54 are arranged in an under-wing configuration, and the third of the electric propulsion engines 54 is arranged as, or more specifically is configured as, a boundary layer ingestion fan. In such a manner, the boundary layer ingestion fan is coupled to the fuselage of the aircraft 10 at the aft end 18 of the aircraft 10 (aft of the pair of wings 20). More specifically, the boundary layer ingestion fan is incorporated into or blended with a tail section at the aft end 18 of the aircraft 10.

Although not depicted, the propulsion system 50 may further include a power source an electric power distribution bus. The electric power distribution bus may direct electrical power from the power source to the one or more electric propulsion engines 54. The power source may be a dedicated gas turbine engine and electric machine generator, or alternatively, may be an electric machine driven by one or more of the plurality of gas turbine propulsion engines 52. Other configurations are contemplated as well.

Referring still to FIG. 1, it will be appreciated that the aircraft 10 further includes one or more aircraft heat sources 60. Specifically, for the embodiment depicted, the aircraft heat sources 60 of the aircraft 10 include an avionics system heat source (a first aircraft heat source 60A), a cockpit heat source (a second aircraft heat source 60B), and an aircraft environmental control system heat source (a third aircraft heat source 60C). One or more of these aircraft heat sources 60 are aligned along the longitudinal direction L1 with the pair of wings 20, or positioned forward of the pair of wings 20, and may generate a varying amount of heat during operation of the aircraft 10 based on, e.g., an operating condition of the aircraft 10, ambient conditions, etc.

In order to reject heat generated by the one or more aircraft heat sources 60, the aircraft 10 further includes a thermal management system 100. The thermal management system 100 generally includes a heat source exchanger 102 in thermal communication with the aircraft heat source 60, a heat sink exchanger 104 in thermal communication with an electric propulsion engine 54, and a thermal distribution bus 106 extending from the heat source exchanger 102 to the heat sink exchanger 104. For the embodiment shown, the heat source exchanger 102 is aligned with, or positioned forward of, the pair of wings 20 and the heat sink exchanger 104 is positioned aft of the pair of wings 20. Further, it will be appreciated that the aircraft 10 includes a control system 108. The control system 108 is operably connected to the thermal management system 100 for selectively thermally coupling the heat sink exchanger 104 with the heat source exchanger 102. As used herein, the term "selectively thermally coupling" refers to changing an amount of heat flow from one component to another, and does not necessarily require changing the amount of heat flow between completely thermally coupled and completely thermally decoupled.

Specifically, for the embodiment of FIG. 1, the heat source exchanger 102 is one of a plurality of heat source exchangers 102 of the thermal management system 100. More specifically, the thermal management system 100 includes three heat source exchangers 102A, 102B, 102C, with each heat source exchanger 102 thermally coupled to a respective aircraft heat source 60. Further, for the embodiment depicted, the heat sink exchanger 104 is in thermal communication with the third electric propulsion engine 54, configured as a boundary layer ingestion fan.

Operation of the thermal management system 100 and control system 108 of the exemplary aircraft 10 of FIG. 1 will be described in greater detail below with reference to, e.g., FIG. 2.

It should be appreciated, however, that in other embodiments the electric propulsion system 50 and/or thermal management system 100 may be configured in any other suitable manner. For example, in other embodiments, the propulsion system 50 may have any other suitable number and/or arrangement of propulsion engines, such as any other suitable number or arrangement of gas turbine propulsion engines 52 and/or electric propulsion engines 54. Similarly, although the heat source exchangers 102A, 102B, 102C are in thermal communication with aircraft systems that are separate from the propulsion system 50 (i.e., are not systems creating thrust or supporting engines that create thrust or power for the propulsion system 50), in other embodiments the thermal management system 100 may be thermally coupled to any other suitable aircraft heat source 60, such as a combustion engine heat source (e.g., a heat source of one or more of the gas turbine propulsion engines 52), a hydraulic load heat source, a non-biological heat source (e.g., any other machine or system heat source of the aircraft), etc.

Further, it should be appreciated that although for the embodiment shown the aircraft 10 is configured as an airplane, in other embodiments, any other suitable aeronautical vehicle may be used. For example, in other embodiments, the aircraft 10 may be configured as a helicopter or other vertical takeoff and landing vehicle, an unmanned aeronautical vehicle, etc.

Figure 2:
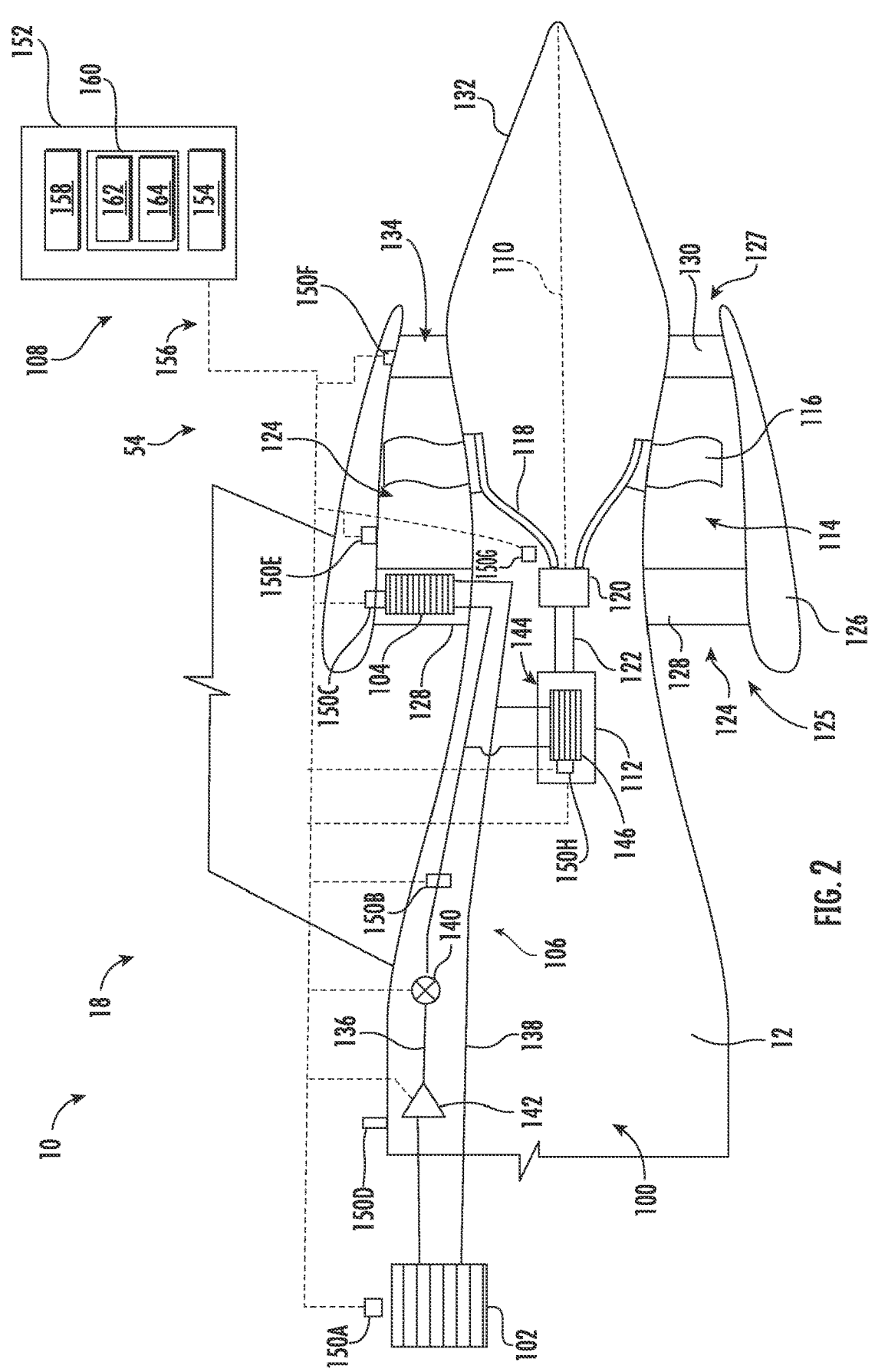
FIG. 2 it is a schematic, cross-sectional view of an aft engine in accordance with an exemplary embodiment of the present disclosure.

Referring now to FIG. 2, a schematic, cross-sectional view of the aft end 18 of the aircraft 10 described above with reference to FIG. 1 is provided. Specifically, FIG. 2 provides a schematic, cross-sectional view of the third electric propulsion engine 54 of the exemplary propulsion system 50 of FIG. 1, configured as the boundary layer ingestion fan 114, and the thermal management system 100.

Referring particularly to the exemplary electric propulsion engine 54 depicted, it will further be appreciated that the electric propulsion engine 54 generally defines a central axis 110 and includes an electric motor 112 and a fan 114 rotatable by the electric motor 112 about the central axis 110. The fan 114 generally includes a plurality of fan blades 116 spaced circumferentially about the central axis 110 and coupled to a fan shaft 118.

In certain exemplary embodiments, the plurality of fan blades 116 may be attached in a fixed manner to the fan shaft 118, or alternatively, the plurality of fan blades 116 may be rotatably attached to the fan shaft 118. For example, the plurality of fan blades 116 may be attached to the fan shaft 118 such that a pitch of each of the plurality of fan blades 116 may be changed, e.g., in unison, by a pitch change mechanism (not shown). Changing the pitch of the plurality of fan blades 116 may increase an efficiency of the electric propulsion engine 54 and/or may allow the electric propulsion engine 54 to achieve a desired thrust profile.

Moreover, as briefly noted above the fan 114 is rotatable about the central axis 110 of the electric propulsion engine 54 by the electric motor 112. More particularly, for the embodiment depicted, the electric propulsion engine 54 additionally includes a gearbox 120 mechanically coupled to the electric motor 112, with the fan 114 mechanically coupled to the gearbox 120. For example, for the embodiment depicted, the fan shaft 118 extends to and is coupled to the gearbox 120, and a driveshaft 122 of the electric motor 112 extends to and is also coupled to the gearbox 120. Accordingly, for the embodiment depicted, the fan 114 is rotatable about the central axis 110 of the electric propulsion engine 54 by the electric motor 112 through/across the power gearbox 120.

The gearbox 120 may include any type of gearing system for altering a rotational speed between the driveshaft 122 and the fan shaft 118. For example, the gearbox 120 may be configured as a star gear train, a planetary gear train, or any other suitable fixed or variable gear ratio gear train configuration. Alternatively, any other type of speed change mechanism (e.g., transmission) may be provided. Alternatively, still, the electric propulsion engine 54 may not include a gearbox 120.

Further, the electric propulsion engine 54 defines a fan air flowpath 124. More specifically, for the embodiment shown, the electric propulsion engine 54 additionally includes an outer nacelle 126, such that the fan air flowpath 124 is a ducted air flowpath defined in part by the outer nacelle 126 and extending between an inlet 125 and an outlet 127. The exemplary outer nacelle 126 is supported by a plurality of guide vanes, and more specifically, by one or more stages of guide vane. More specifically, still, for the embodiment shown, the one or more stages of guide vanes includes a stage of inlet guide vanes 128 positioned forward of the plurality of fan blades 116 of the fan 114, as well as a stage of the outlet guide vanes 130 positioned aft of the plurality of fan blades 116 of the fan 114.

Moreover, the electric propulsion engine 54 further includes a tail cone 132, with the stage of outlet guide vanes 130 extending between the outer nacelle 126 and the tail cone 132. The electric propulsion engine 54 defines a nozzle 134 between the outer nacelle 126 and the tail cone 132. The nozzle 134 may be configured to generate an amount of thrust from the air flowing through the fan air flowpath 124, and the tail cone 132 may be shaped to minimize an amount of drag on the electric propulsion engine 54. However, in other embodiments, the tail cone 132 may have any other shape and may, e.g., end forward of an aft end of the nacelle 126 (the outlet 127 for the embodiment shown) such that the tail cone 132 is enclosed by the nacelle 126 at an aft end. Additionally, in other embodiments, the electric propulsion engine 54 may not be configured to generate any measureable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10). Notably, in certain embodiments, the electric propulsion engine 54 may include components to vary a cross-sectional area of the nozzle 134, such that the electric propulsion engine 54 includes a variable area fan nozzle.

Referring now particularly to the exemplary thermal management system 100 of the aircraft 10, as discussed above, the thermal management system 100 generally includes a heat source exchanger 102, a heat sink exchanger 104, and a thermal distribution bus 106. Although the exemplary heat source exchanger 102 is depicted in isolation in FIG. 2, it will be appreciated that the heat source exchanger 102 is thermally coupled to an aircraft heat source 60 (see, e.g., FIG. 1), for accepting heat from such aircraft heat source 60. As noted above, in certain embodiments, the aircraft heat source 60 may be, e.g., an avionics system heat source, a cockpit source, an aircraft environmental control system heat source, a combustion engine source, a hydraulic load heat source, etc. In such a manner, the heat source exchanger(s) 102 may be configured to receive a varying amount of heat during operation of the aircraft 10. For example, the heat source exchanger(s) 102 may receive an amount of heat that varies based on, e.g., an operating condition and/or ambient conditions of the aircraft 10.

The heat sink exchanger 104 is in thermal communication with the fan air flowpath 124 of the electric propulsion engine 54. Specifically, for the embodiment shown, the heat sink exchanger 104 may be coupled to, or integrated with, a stage of guide vanes (such as the stage of inlet guide vanes 128 or stage of outlet guide vanes 130), the outer nacelle 126, or both. More specifically, for the embodiment shown, the heat sink exchanger 104 is coupled to, or integrated with, the stage of inlet guide vanes 128 of the electric propulsion engine 54. In such a manner, it will be appreciated that the heat sink exchanger 104 may be a single heat sink exchanger 104, or alternatively, may be one of a plurality of heat sink exchangers 104 of the thermal management system 100 coupled to, or integrated with, a respective plurality of inlet guide vanes 128. Additionally, or alternatively still, in other embodiments one or more of the plurality of heat sink exchangers 104 (if a plurality of such heat sink exchangers 104 is included) may be coupled to, or integrated with the outer nacelle 126, the stage of outlet guide vanes 130, or any other suitable location thermally coupled to the fan air flowpath 124.

Further, the thermal distribution bus 106, as stated, extends between the heat source exchanger 102 and the heat sink exchanger 104. Specifically, as is depicted schematically, the thermal distribution bus 106 generally includes a first line 136 extending from the heat source exchanger 102 to the heat sink exchanger 104, and a second line 138 extending from the heat sink exchanger 104 back to the heat source exchanger 102. Each of the first line 136 and second line 138 may include one or more fluid conduits or other fluid lines. Additionally, as will be appreciated, the thermal management system 100 may include any suitable thermal transfer fluid flowing through the heat source exchanger 102, thermal distribution bus 106, and heat sink exchanger 104. For example, the thermal transfer fluid may be a single phase fluid, a phase change fluid, a supercritical fluid, etc.

In order to facilitate a desired flow of thermal transfer fluid through the thermal distribution bus 106, the thermal management system 100 further includes a flow regulation device operable with the thermal distribution bus 106. The flow regulation device may generally be configured for varying a flow of thermal transfer fluid through the thermal distribution bus 106. More specifically, for the embodiment shown, the thermal management system 100 includes a pair of flow regulation devices, the pair of flow regulation devices including a variable throughput valve 140 in flow communication with the thermal distribution bus 106, as well as a thermal fluid pump 142 positioned in flow communication with the thermal distribution bus 106. Notably, however, in other embodiments, the thermal management system 100 may only include a single flow regulation device.

The variable throughput valve 140 may be movable between a fully open position (in which the valve 140 does not restrict any of the thermal transfer fluid flow therethrough), a fully closed position (in which the valve 140 restricts all of the thermal transfer fluid flow therethrough), as well as one or more positions therebetween (e.g., a ten percent restricted flow position, a twenty-five percent restricted flow position, a fifty percent restricted flow position, a seventy-five percent restricted flow position, a ninety percent restricted flow position, etc.). In such a manner, the variable throughput valve 140 may be configured for varying an amount of heat provided to the heat sink exchanger 104 (via the heat transfer fluid through the thermal distribution bus 106), and therefore, an amount of heat provided to the fan air flowpath 124.

The thermal fluid pump 142 may be any suitable pump 142 for increasing a flow rate and/or pressure of the thermal fluid within the thermal distribution bus 106. For example, the pump 142 may be a rotary pump, an electric powered fluid pump, or any other suitable fluid pump. The thermal fluid pump 142 may be operational between various power levels to vary the flow of thermal fluid through the thermal distribution bus 106. For example, the thermal fluid pump 142 may be operational between an off position providing no increase in flow rate and/or pressure of the thermal fluid through the thermal distribution bus 106, a maximum power position providing a maximum amount of increase in flow rate and/or pressure of the thermal fluid through the thermal distribution bus 106, and one or more power-level positions therebetween (e.g., a ten percent power, twenty-five percent power, fifty percent power, seventy-five percent power, ninety percent power, etc.). In such a manner, the thermal fluid pump 142 may similarly be configured for varying an amount of heat provided to the heat sink exchanger 104 (via the heat transfer fluid through the thermal distribution bus 106), and therefore, an amount of heat provided to the fan air flowpath 124.

Notably, however, in other embodiments, any other suitable flow regulation device may be provided. For example, in other embodiments, the flow regulation device may include a bypass passage for bypassing the heat sink exchanger(s) 104 and/or heat source exchanger(s) 102.

Briefly, it will further be appreciated that for the embodiment depicted the thermal management system 100 is an aircraft-specific thermal management system 100. Specifically, the thermal management system 100 may be referred to as an aircraft thermal management system 100, the heat source exchanger 102 may be referred to as an aircraft heat source exchanger 102, and the heat sink exchanger 104 may be referred to as an aircraft heat sink exchanger 104. Further, for the embodiment depicted, the electric propulsion engine 54 further includes an engine thermal management system 144. The engine thermal management system 144 may be configured to reject an amount of heat generated by, e.g., the electric motor 112, the gearbox 120, one or more bearings (not shown), and/or other electric propulsion engine systems during operation. The engine thermal management system 144 generally includes an engine heat source exchanger 146 which, for the embodiment shown, is in thermal communication with the electric motor 112 for accepting heat from the electric motor 112. Further, for the embodiment shown, the engine thermal management system 144 does not include a separate, dedicated heat sink exchanger, and instead, is in thermal communication with the aircraft heat sink exchanger 104 of the aircraft thermal management system 100. In such a manner, the aircraft heat sink exchanger 104 is, for the embodiment shown, a shared heat sink exchanger (i.e., shared with the engine thermal management system 144). Although not depicted, the engine thermal management system 144 may include one or more valves, pumps, etc. to ensure proper flow therethrough.

Figure 3:
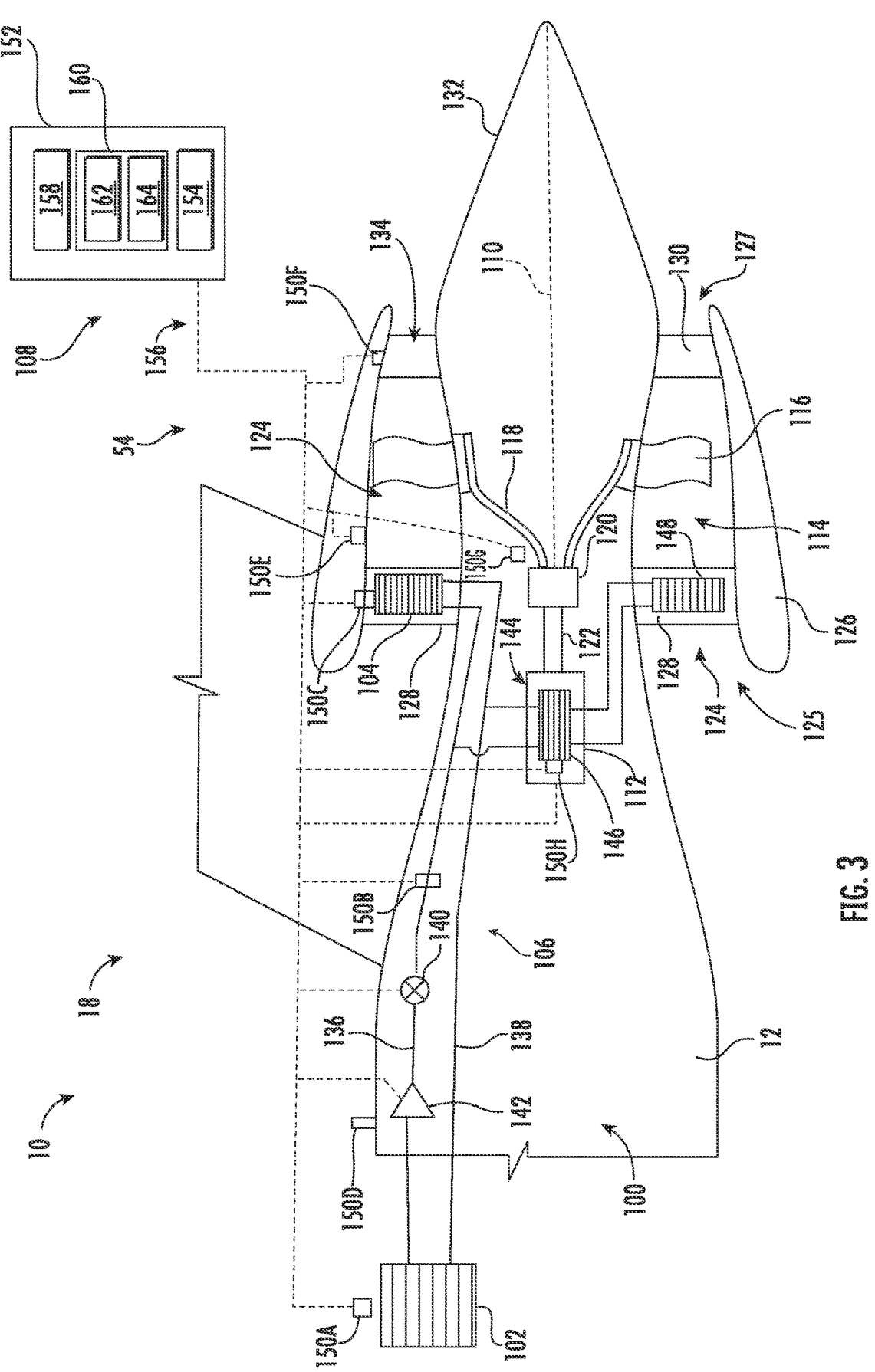
FIG. 3 is a schematic, cross-sectional view of an aft engine in accordance with another exemplary embodiment of the present disclosure.

It will be appreciated, however, that in other embodiments, any other suitable engine thermal management system 144 may be provided. For example, referring now briefly to FIG. 3, an aft end 18 of an aircraft 10 including an electric propulsion engine 54 configured as a boundary layer ingestion fan at an aft end 18 of the aircraft 10 in accordance with another embodiment of the present disclosure is provided. The aircraft 10 of FIG. 3 may be configured in substantially the same manner as exemplary aircraft 10 of FIG. 2. However, for the embodiment of FIG. 3, an engine thermal management system 144 of the electric propulsion engine 54 does not share a heat sink exchanger with an aircraft thermal management system 100 of the aircraft 10. More specifically, for the embodiment of FIG. 3, the engine thermal management system 144 includes a separate, dedicated engine heat sink exchanger 148. The engine heat sink exchanger 148 is also in thermal communication with the fan air flowpath 124 and is configured to receive heat from the engine heat source exchanger 146 to reject such heat to the fan air flowpath 124. For the embodiment shown, the engine heat sink exchanger 148 is positioned in parallel with the aircraft heat sink exchanger 104. In certain embodiments, the engine thermal management system 144 may continuously reject heat to the fan air flowpath 124, while the thermal management system 100 selectively rejects heat to the fan air flowpath 124.

It will further be appreciated that, in still other exemplary embodiments, the thermal management system 100 (i.e., the aircraft thermal management system 100) may be incorporated into any other suitable electric propulsion engine 54. For example, referring now to FIG. 4, a schematic, cross-sectional view is depicted of an under-wing mounted electric propulsion engine 54. The electric propulsion engine 54 of FIG. 4 may be one of the under-wing mounted electric propulsion engines 54 depicted in FIG. 1. Further, the electric propulsion engine 54 and aircraft 10 of FIG. 4 may be configured in a similar manner to the exemplary electric propulsion engine 54 and aircraft 10 described above with reference to FIG. 2.

Figure 4:
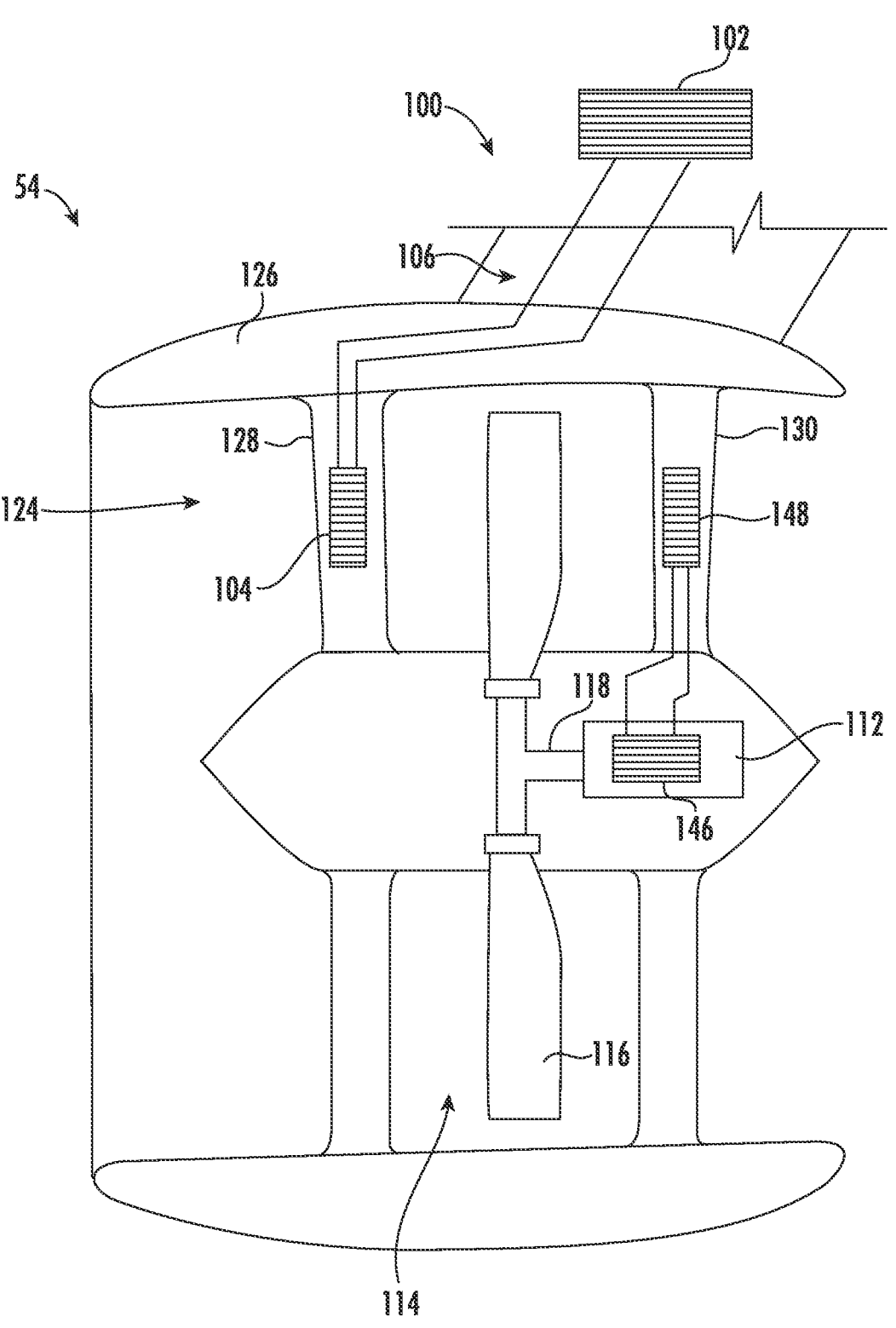
FIG. 4 is a schematic, cross-sectional view of an electric propulsion engine in accordance with yet another exemplary embodiment of the present disclosure.

For example, the exemplary electric propulsion engine 54 of FIG. 4 generally includes a fan 114 and an electric motor 112, with the fan 114 being rotatable by the electric motor 112. Additionally, the electric propulsion engine 54 of FIG. 4 defines a fan air flowpath 124, and more specifically, includes an outer nacelle 126 such that the fan air flowpath 124 is a ducted air flowpath defined at least in part by the outer nacelle 126. Moreover, the electric propulsion engine 54 includes one or more stages of guide vanes, and more particularly, a stage of inlet guide vanes 128 and a stage of the outlet guide vanes 130. Further, the aircraft 10 of FIG. 4 includes a thermal management system 100 having a heat source exchanger 102 in thermal communication with an aircraft heat source 60 (see FIG. 1), a heat sink exchanger 104 in thermal communication with the fan air flowpath 124 of the electric propulsion engine 54, and a thermal distribution bus 106 extending from the heat source exchanger 102 to the heat sink exchanger 104. Although not depicted, the aircraft 10 further includes a control system 108 operably connected to the thermal management system 100 for selectively thermally coupling the heat sink exchanger 104 to the heat source exchanger 102 (see FIG. 2 and discussion below). Further, similar to the embodiment of FIG. 3, above, the thermal management system 100 is an aircraft-specific thermal management system 100, and the electric propulsion engine 54 includes a separate engine thermal management system 144. The engine thermal management system 144 includes an engine heat source exchanger 146 and an engine heat sink exchanger 148 thermally coupled to the engine heat source exchanger 146. Notably, the engine heat sink exchanger 148 is arranged in series with the aircraft heat sink exchanger 104 for the embodiment shown.

It will further be appreciated, however, that, in still other embodiments, such as wherein the engine heat sink exchanger 148 is one of a plurality of engine heat sink exchangers 148 and/or the aircraft heat sink exchangers 104 is one of a plurality of aircraft heat sink exchangers 104, one or more of the engine heat sink exchanger(s) 148 and aircraft heat sink exchanger(s) 104 may be arranged in both series and parallel within the fan air flowpath 124.

Referring now back to FIG. 2, as briefly noted above, the aircraft 10 further includes a control system 108 operably connected to the thermal management system 100 for selectively thermally coupling the heat sink exchanger 104 with the heat source exchanger 102 of the thermal management system 100.

More specifically, the exemplary control system 108 of FIG. 2 generally includes a plurality of sensors 150 and a controller 152. The plurality of sensors 150 may be configured to sense data indicative of, e.g., one or more operating conditions of a thermal management system (e.g., the aircraft thermal management system 100 and/or the engine thermal management system 144), one or more ambient conditions (e.g., ambient temperature, pressure, flowrate, humidity, etc.), one or more operating conditions of the electric propulsion engine 54, etc. For the embodiment depicted, the plurality of sensors 150 includes a first sensor 150A configured to sense data indicative of a temperature of the aircraft heat source exchanger 102, a second sensor 150B configured to sense data indicative of a parameter of the thermal distribution bus 106 (such as a thermal fluid flow rate, a thermal fluid pressure, a thermal fluid temperature, etc.), a third sensor 150C configured to sense data indicative of a temperature of the aircraft heat sink exchanger 104, a fourth sensor 150D configured to sense one or more ambient conditions (such as an ambient temperature, ambient pressure, ambient air flow speed, etc.), a fifth sensor 150E configured to sense data indicative of a fan air flowpath parameter at a location upstream of the fan 114 (such as a temperature, a pressure, a flow rate, etc.), a sixth sensor 150F configured to sense data indicative of a fan air flowpath parameter at a location downstream of the fan 114 (such as a temperature, a pressure, a flow rate, etc.), a seventh sensor 150G configured to sense data indicative of an operating parameter of the fan 114 (such as a rotational speed of the plurality of fan blades 116 of the fan 114, a torque on the fan shaft 118, etc.), and an eighth sensor 150H configured to sense data indicative of an operating condition of the engine thermal management system 144 (such as a temperature of the engine heat source exchanger 146). However, in other embodiments, other sensors 150 may additionally, or alternatively, be included and/or the control system 108 may not include each of the above sensors 150.

Further, as noted above, the control system 108 includes the controller 152. The controller 152 generally includes a network interface 154. The network interface 154 may be operable with any suitable wired or wireless communications network for communicating data with other components of, e.g., the aircraft 10, including, the electric propulsion engine 54, the thermal management system 100, etc. As depicted using phantom lines in FIG. 2, for the embodiment depicted, the network interface 154 utilizes a wireless communication network 156 to communicate data with other components. Specifically, for the embodiment shown, through the network interface 154 of the controller 152 and the wireless communication network 156, the controller 152 is operably coupled to each of the plurality of sensors 150, the flow regulation device of the thermal management system 100 (e.g., the variable throughput valve 140 and the thermal fluid pump 142 of the thermal management system 100), the electric propulsion engine 54 (e.g., the electric motor 112 of the electric propulsion engine 54), etc. In such a manner, the controller 152 may be configured to receive data indicative of various operating conditions and parameters of the aircraft 10, the thermal management system 100, the electric propulsion engine 54, etc., and further may be configured to provide control instructions to various aspects of the thermal management system 100, the electric propulsion engine 54, etc. It will be appreciated, of course, that although the network interface 154 utilizes the wireless communication network 156 for the embodiment of FIG. 2, in other embodiments, the network interface 154 may instead utilize a wired communication network, or a combination of wired and wireless communication networks.

Referring still to FIG. 2, the controller 152 further includes one or more processors 158 and memory 160. The memory 160 stores data 162 accessible by the one or more processors 158. The one or more processor(s) 158 can include any suitable processing device, such as a microprocessor, microcontroller, integrated circuit, logic device, and/ or other suitable processing device. The one or more memory device(s) 160 can include one or more computer-readable media, including, but not limited to, non-transitory computer-readable media, RAM, ROM, hard drives, flash drives, and/or other memory devices. The memory 160 may include instructions 164 that when executed by the one or more processors 158 cause the aircraft 10 (and/or one or more of its systems or components) to perform functions. One or more exemplary aspects of these functions may be described below with respect to the exemplary method 200 of FIG. 5. The instructions 164 within the memory device(s) 160 can be any set of instructions that when executed by the one or more processor(s) 158, cause the one or more processor(s) 158 to perform operations. In certain exemplary embodiments, the instructions 164 within the memory device(s) 160 can be software written in any suitable programming language or can be implemented in hardware. Additionally, and/or alternatively, the instructions can be executed in logically and/or virtually separate threads on processor(s) 158. The memory device(s) 160 can further store other data 162 that can be accessed by the processor(s) 158, including data received through the wireless communication network 156 from the network interface 154.

As will be explained in greater detail below, an aircraft 10 including a thermal management system 100, electric propulsion engine 54, and control system 108 in accordance with one or more exemplary aspect of the present disclosure may facilitate an overall more efficient aircraft 10. For example, such an aircraft 10 may selectively provide heat from one or more aircraft heat sources 60 to the fan air flowpath 124 of an electric propulsion engine 54 in a manner that does not increase, or at least does not substantially increase, an overall drag on the aircraft 10. Further, the system may monitor various parameters of the electric propulsion engine 54, and quickly and relatively accurately control various operating conditions of the electric propulsion engine 54 to facilitate the desired amount of heat transfer to the fan air flowpath 124 of such electric propulsion engine 54. For example, the system may allow for slowing down the fan 114 of the electric propulsion engine 54 during, e.g., flight operations to facilitate a relatively large amount of heat transfer to the fan air flowpath 124. More specifically, in certain exemplary embodiments, the electric propulsion engine 54 may define a maximum rated speed for the fan 114, and the system slow the speed of the fan 114 of the electric propulsion engine 54 to less than about twenty (20) percent of the maximum rated speed, such as to less than about fifteen percent of the maximum rated speed, such as to less than about ten percent of the maximum rated speed. However, the system may maintain a speed of the fan above a stall threshold, which depending on the conditions and fan configuration may be at least about five percent of the maximum rated speed of the fan 114. Alternatively, however, in other exemplary embodiments, the system slow the speed of the fan 114 of the electric propulsion engine 54 to less than about fifty (50) percent of the maximum rated speed (e.g., for smaller gas turbine engines).

By reducing the rotational speed of the electric propulsion engine 54 in such a manner, the system may prevent a stalling of the electric propulsion engine 54 despite the relatively large amount of heat energy added to the fan air flowpath 124. Such would be difficult to achieve on a gas turbine engine (particularly during flight operations) that must rotate at a minimum rotational speed to prevent, e.g., a flame out of the combustion section of such gas turbine engine.

Referring now to FIG. 5, a flow diagram of a method 200 for operating an aircraft in accordance with an exemplary aspect of the present disclosure is provided. The exemplary method 200 may be utilized with one or more the exemplary aircraft (and associated propulsion systems and thermal management systems) described above with reference to FIGS. 1 through 4. Alternatively, however, in other exemplary aspects, the method 200 may be utilized with any other suitable aircraft and associated systems.

The method 200 includes at (202) receiving data indicative of an operating condition of an electric propulsion engine of a propulsion system of the aircraft. In at least certain exemplary aspects, the operating condition of the electric propulsion engine may be a rotational speed of a fan of the electric propulsion engine. However, in other exemplary aspects, the operating condition may be a pressure, temperature, etc. of an airflow through a fan air flowpath upstream of the fan, downstream of the fan, or both.

The exemplary method 200 further includes at (204) receiving data indicative of a desired amount of heat exchange from the heat source exchanger in thermal communication with an aircraft heat source to a heat sink exchanger in thermal communication with the fan air flowpath of the electric propulsion engine. The data received at (204) may be, e.g., temperature data of the aircraft heat source, of the thermal fluid through the heat source exchanger, or of the thermal fluid through a thermal distribution bus extending between the heat source exchanger and the heat sink exchanger, and/or may be data indicative of operating conditions of the aircraft heat source, ambient conditions of the aircraft, or any other suitable data indicative of an amount of heat needing to be rejected for the aircraft heat source.

Referring still to FIG. 5, the method 200 includes at (206) controlling an actual amount of heat exchange from the heat source exchanger to the heat sink exchanger, an operating parameter of the electric propulsion engine, or both based on the received data indicative of the operating condition of the electric propulsion engine at (202) and the received data indicative of the desired amount of heat exchange at (204). More specifically, for the exemplary aspect depicted, controlling the actual amount of heat exchange from the heat source exchanger to the heat sink exchanger, the operating parameter of the electric propulsion engine, or both at (206) includes at (208) metering an airflow through the fan air flowpath to facilitate the provision of the desired amount of heat exchange from the heat source exchanger to be heat sink exchanger. Metering the airflow through the fan air flowpath at (208) may involve controlling any suitable parameter or component that modifies the airflow through the fan air flowpath. For example, in certain exemplary aspects, metering the airflow through the fan air flowpath at (208) may include modifying one or more variable geometry components of the electric propulsion engine (such as, for example, variable inlet guide vanes, variable outlet guide vanes, variable area fan nozzles, etc.). Notably, metering the airflow through the fan air flowpath at (208) may include increasing or decreasing the airflow through the fan air flowpath.

Additionally, for the exemplary aspect depicted, controlling the actual amount of heat exchange from the heat source exchanger to the heat sink exchanger, the operating parameter of the electric propulsion engine, or both at (206) includes at (210) reducing a speed of the fan of the electric propulsion engine. More specifically still, reducing the speed of the fan of the electric propulsion engine at (210) includes at (212) reducing the speed of the fan during flight operations of the aircraft to less than twenty (20) percent of a maximum rated speed. Briefly, as used herein, the term "flight operations" refers to airborne flight operations (i.e., when the aircraft is airborne).

Notably, metering the airflow at (208), which may include reducing the rotational speed of the fan at (210), may allow for an increased amount of heat exchange to the fan air flowpath via the heat sink exchanger. For example, in certain exemplary aspects, the method 200 may slow the rotational speed of the fan to essentially an idle rotational speed during flight operations such that a relatively large amount of heat may be transferred to the fan air flowpath without choking out the fan of the electric propulsion engine. In such a manner, the electric propulsion engine may be effectively converted into a ram cooler providing for short-term, or varying, heat exchange when, e.g., additional thrust is not necessary. In such a manner, the method 200 may reject heat without introducing additional drag losses to the aircraft, such as is the case with traditional RAM heat exchangers/coolers.

Additionally, or alternatively, in other aspects, the method 200 may ensure the fan is not choked off by the addition of heat to the fan air flowpath in other suitable manner. For example, as is depicted in phantom, in certain exemplary aspects controlling the actual amount of heat exchange from the heat source exchanger to the heat sink exchanger, the operating parameter of the electric propulsion engine, or both at (206) includes at (214) controlling the actual amount of heat exchange from the heat source exchanger to the heat sink exchanger. For the exemplary aspect depicted, controlling the actual amount of heat exchange from the heat source exchanger to the heat sink exchanger at (214) includes at (216) controlling a flow regulation device in flow communication with the thermal bus extending between the heat source exchanger and the heat sink exchanger.

Although not depicted, it will further be appreciated that in at least certain exemplary aspects, the method 200 may additionally, or alternatively, control the flow regulation device in flow communication with the thermal bus based on, e.g., the received data indicative of the desired amount of heat exchange from the heat source exchanger to the heat sink exchanger at (204). For example, the method 200 may determine the aircraft heat source needs additional heat exchange (e.g., heat rejection) and control the flow regulation device to facilitate such heat exchange.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an aircraft comprising:
receiving data indicative of an operating condition of an electric propulsion engine of a propulsion system of the aircraft, the electric propulsion engine comprising an electric motor for driving a fan, a stage of inlet guide vanes upstream of the fan, a stage of outlet guide vanes downstream of the fan, an engine heat source exchanger for receiving heat from the electric motor, a first heat sink exchanger in thermal communication with the engine heat source exchanger and coupled to the stage of inlet guide vanes, and a second heat sink exchanger in thermal communication with a heat source exchanger of the aircraft and coupled to the stage of inlet guide vanes;
rejecting heat from the engine heat source exchanger to the first heat sink exchanger in thermal communication with a fan air flowpath of the electric propulsion engine;

receiving data indicative of a desired amount of heat exchange from the heat source exchanger in thermal communication with an aircraft heat source to the second heat sink exchanger in thermal communication with the fan air flowpath of the electric propulsion engine; and
controlling an actual amount of heat exchange from the heat source exchanger to the second heat sink exchanger by controlling a speed of the fan of the electric propulsion engine based on the received data indicative of the operating condition of the electric propulsion engine and the received data indicative of the desired amount of heat exchange.

2. The method of claim 1, wherein the operating condition of the electric propulsion engine is the speed of the fan of the electric propulsion engine.

3. The method of claim 1, wherein:
controlling the speed of the fan of the electric propulsion engine comprises reducing the speed of the fan of the electric propulsion engine; and
reducing the speed of the fan of the electric propulsion engine comprises reducing the speed of the fan during flight operations of the aircraft to less than twenty (20) percent of a maximum rated speed.

4. The method of claim 1, wherein controlling the actual amount of heat exchange from the heat source exchanger to the second heat sink exchanger comprises metering an airflow through the fan air flowpath to facilitate provision of the desired amount of heat exchange from the heat source exchanger to the second heat sink exchanger.

5. The method of claim 1, wherein controlling the actual amount of heat exchange from the heat source exchanger to the second heat sink exchanger comprises controlling a flow regulation device in flow communication with a thermal bus extending between the heat source exchanger and the second heat sink exchanger.

6. The method of claim 5, wherein the flow regulation device is a variable throughput valve positioned in flow communication with a thermal distribution bus, a thermal fluid pump positioned in flow communication with the thermal distribution bus, or both.

7. The method of claim 1, wherein the aircraft heat source is an avionics system heat source, a cockpit heat source, an aircraft environmental control system heat source, a combustion engine heat source, a non-biological heat source, or a hydraulic load heat source.

8. The method of claim 1, further comprising:
a pair of wings, wherein heat source exchanger is aligned with the pair of wings along a longitudinal direction of the aircraft or positioned forward of the pair of wings along the longitudinal direction of the aircraft, and wherein the first heat sink exchanger and the second heat sink exchanger is positioned aft of the pair of wings along the longitudinal direction of the aircraft.

* * * * *